United States Patent
Li et al.

(10) Patent No.: US 7,894,090 B2
(45) Date of Patent: *Feb. 22, 2011

(54) METHOD FOR ENSURING RELIABLE TRANSMISSION OF DCN SIGNAL BY A GATEWAY

(75) Inventors: Ruihua Li, Shenzhen (CN); Wei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 526 days.

This patent is subject to a terminal disclaimer.

(21) Appl. No.: 11/782,718

(22) Filed: Jul. 25, 2007

(65) Prior Publication Data

US 2008/0018948 A1      Jan. 24, 2008

Related U.S. Application Data

(63) Continuation of application No. PCT/CN2006/000172, filed on Jan. 26, 2006.

(30) Foreign Application Priority Data

Jan. 26, 2005   (CN) ......................... 2005 1 0033038

(51) Int. Cl.
*G06F 3/12* (2006.01)
*H04N 1/04* (2006.01)

(52) U.S. Cl. ...................... 358/1.15; 358/407; 358/405

(58) Field of Classification Search ................. 358/1.9, 358/1.15, 407, 400, 404, 437, 438, 401, 405; 370/401; 709/230; 379/100.01, 100.02, 379/100.04, 100.06, 100.09

See application file for complete search history.

(56) References Cited

U.S. PATENT DOCUMENTS 6,381,038 B1 *  4/2002 Endo ......................... 358/400

(Continued)

FOREIGN PATENT DOCUMENTS

CN            1427614 A         7/2003

(Continued)

OTHER PUBLICATIONS

European Search Report dated Mar. 31, 2008 Application No./Patent No. 06705593.9-1228 PCT/CN2006/000172.

(Continued)

*Primary Examiner*—Jerome Grant, II
(74) *Attorney, Agent, or Firm*—Finnegan, Henderson, Farabow, Garrett & Dunner LLP

(57) ABSTRACT

A method for ensuring reliable transmission of a DCN signal by a gateway is disclosed. When acting as a sending gateway, the gateway packs a DCN signal detected into an IFP packet and sends the IFP packet to the IP side, then, reports a fax end event to a Soft Switch after a designated delay period; and the Soft Switch issues a State Switching Command for switching the two gateways back to voice state after receiving the fax end event. When acting as a receiving gateway, the gateway modulates a DCN signal detected and sends the modulated DCN signal to a receiving facsimile machine; if a switching command issued by a Soft Switch is received during sending the DCN signal, the gateway delays the switching; if the gateway has not received a switching command after the DCN data is sent, the gateway initiatively reports a fax end event.

10 Claims, 4 Drawing Sheets

U.S. PATENT DOCUMENTS

| | | | |
|---|---|---|---|
| 6,414,758 B1 | 7/2002 | Stovall | |
| 6,522,429 B2* | 2/2003 | Endo | 358/400 |
| 6,665,293 B2 | 12/2003 | Thornton et al. | |
| 6,721,282 B2 | 4/2004 | Motley | |
| 6,781,722 B1* | 8/2004 | Goldsmith | 358/437 |
| 6,856,431 B2 | 2/2005 | Ohta | |
| 6,985,255 B2* | 1/2006 | Saito | 358/1.9 |
| 7,151,614 B1* | 12/2006 | Umansky et al. | 358/1.15 |
| 7,218,424 B2 | 5/2007 | Cohen | |
| 7,420,960 B2 | 9/2008 | Somekh et al. | |
| 2002/0001373 A1 | 1/2002 | Sakurai | |
| 2002/0101613 A1* | 8/2002 | Endo | 358/1.15 |
| 2002/0101860 A1 | 8/2002 | Thornton et al. | |
| 2003/0223463 A1 | 4/2003 | Abrishami et al. | |
| 2003/0193696 A1 | 10/2003 | Walker et al. | |
| 2004/0021894 A1 | 2/2004 | Mundra | |
| 2004/0042467 A1* | 3/2004 | Abrishami et al. | 370/401 |
| 2006/0028692 A1 | 2/2006 | Kajiwara | |
| 2006/0067301 A1 | 3/2006 | Fruth et al. | |
| 2006/0109503 A1* | 5/2006 | Hong | 358/1.15 |
| 2006/0136596 A1* | 6/2006 | Izumi | 709/230 |
| 2006/0250997 A1 | 11/2006 | Smith et al. | |
| 2007/0025480 A1* | 2/2007 | Tackin et al. | 375/345 |
| 2007/0133516 A1 | 6/2007 | Stein | |
| 2008/0018948 A1 | 1/2008 | Li et al. | |

FOREIGN PATENT DOCUMENTS

| | | |
|---|---|---|
| CN | 100555966 C | 10/2009 |
| WO | WO 01/97503 A1 | 12/2001 |

OTHER PUBLICATIONS

Written Opinion of the International Searching Authority (translation) dated (mailed) May 18, 2006, issued in related application No. PCT/CN2006/000172, filed Jan. 26, 2006, Huawei Technologies Co., Ltd.

International Search Report dated (mailed) May 16, 2006, issued in related application No. PCT/CN2006/000172, filed Jan. 26, 2006, Huawei Technologies Co., Ltd.

International Preliminary Report on Patentability dated (mailed) Jul. 31, 2007, issued in related application No. PCT/CN2006/000172, filed Jan. 26, 2006, Huawei Technologies Co., Ltd.

T.38 fax service under H.248 protocol, China Academic Journal Electronic Publishing House, No. 12, (2004).

Series T: Terminals for Telematic Services; Procedures for document facsimile transmission in the general switched telephone network, ITU -T Recommendation T.30, International Telecommunication Union, Jul. 2003, 320 pages.

Series T: Terminals for Telematic Services; Facsimile - Group 3 protocols; Procedures for real-time Group 3 facsimile communication over IP networks, ITU-T Recommendation T.38, International Telecommunication Union, Apr. 2007, 125 pgs.

International Telecommunication Union ITU-T V.21, Telecommunication Standization Sector of ITU Data, Data Communication Over The Telephone Network, 300 Bits per second duplex modem standardized for use in the general switched telephone network, ITU-T Recommendation V.21, 7 pages.

\* cited by examiner

METHOD FOR ENSURING RELIABLE TRANSMISSION OF DCN SIGNAL BY A GATEWAY

CROSS-REFERENCES TO RELATED APPLICATIONS

The present application is a continuation of PCT Application Ser. No. PCT/CN2006/000172, filed on Jan. 26, 2006, which claims a priority to Chinese Patent Application No. 200510033038.X, filed on Jan. 26, 2005. All of these applications are incorporated herein by reference for all purposes.

FIELD OF THE INVENTION

The present invention relates to communication technologies, and more particularly, to a method for a T.38 gateway to ensure reliable transmission of a Disconnect (DCN) signal to a facsimile machine in real-time Internet Protocol (IP) Fax mode.

BACKGROUND OF THE INVENTION

The wide use of Internet and the maturity of Internet technologies make it possible to transmit traditional Fax information over Internet. Accordingly, IP Fax-related technologies emerge as the times require. According to real-time attributes, IP Fax may be divided into Store-Forward IP Fax and Real-time IP Fax. According to gateway processing modes, the Real-time IP Fax may be further divided into pass-through mode and T.38 mode. The pass-through mode is not widely used due to its poor network damage resistance. A T.38 Real-time IP Fax gateway mainly serves to process T.38 protocol and Data Pump (DP) modulation and demodulation, whose system structure is illustrated as in FIG. 1. The essential principle of T.38 IP Fax lies in that: a T.38 gateway demodulates the data sent by a facsimile machine, packs the demodulated payload data into an IP packet specified in T.38 protocol, and sends the IP packet to an opposite gateway via IP network; the receiving-party T.38 gateway parses the payload data from the IP packet according to the information attribute of the IP packet, remodulates and sends it to the TDM-side (which refers to the side on which the gateway is connected with the PSTN, such as the side on which gateway 1 is connected with facsimile machine 1 and the side on which gateway 2 is connected with facsimile machine 2 as shown in FIG. 1, and which is called "the TDM side" hereunder) facsimile machine. Thus, it can be seen that, it is Fax signaling or messages exchanged between two terminal facsimile machines that are carried by Real-time IP Fax, and the two terminal facsimile machines communicate with each other in real-time following a Fax process conforming to T.30 protocol. A typical Fax process is shown in FIG. 2.

Usually, a Voice over IP (VOIP) gateway not only supports Fax service, but also supports voice service. The gateway is initially in voice state, and is switched to be in T.38 Fax service state when a Fax event is detected; and when a fax end event is detected, the gateway switches from T.38 Fax state back to voice state, so as to enable a normal voice communication after the Fax. In an NGN network in which the switching between Fax and voice is controlled via Soft Switch, when either of the two gateways in the two sides detects a Fax event, the gateway reports the Fax event to the Soft Switch, and the Soft Switch notifies the two gateways to switch to Fax state via signaling; and correspondingly, when either of the two gateways detects a fax end event, the gateway reports the fax end event to the Soft Switch, and the Soft Switch issues a command to control the gateways to switch from Fax state back to voice state. In T.30 protocol, it is specified that there are two situations for fax end: in one situation, either of the facsimile machines sends a DCN signal to notify the opposite facsimile machine, and the Fax terminates; and in the other situation, exception occurs on the Fax, and the facsimile machine does not send a DCN. Instead, it disconnects the signaling directly. This document focuses on how to reliably detect a fax end event and how to ensure the detecting and switching of a gateway not to influence the reception of the DCN signal by the terminal facsimile machines in the first situation. As shown in FIG. 2, the Fax process successfully proceeds to stage E, and the sending facsimile machine successfully sends a Fax page and then sends a DCN signal to the receiving facsimile machine. If the receiving facsimile machine cannot receive a valid DCN signal, it may consider that the Fax terminates abnormally and send out an alarm sound, which will mislead the Fax user into thinking that the Fax fails, but in fact, the receiving facsimile machine has successfully received the correct Fax page. For convenience in the following context, the facsimile machines and gateway are defined as follows: a sending facsimile machine refers to a facsimile machine that sends a DCN signal, a receiving facsimile machine refers to a facsimile machine that receives a DCN signal, a sending gateway refers to a gateway that is connected with the facsimile machine that sends a DCN signal, and a receiving gateway refers to a gateway connected with the facsimile machine that receives a DCN signal.

At present, a technical solution employed by a gateway of the prior art is illustrated in FIG. 3. A sending gateway, i.e., Gateway 1, detects V.21 frame signals demodulated and received on the Time Division Multiplexing (TDM) side. If a DCN signal is detected by Gateway 1, Gateway 1, acting as a sending gateway, packs the DCN signal into an IP Fax Protocol (IFP) packet and sends the IFP packet to the receiving gateway, i.e., Gateway 2. Aftr IFP packet signal is sent, Gateway 1 reports a fax end event to a Soft Switch. Upon the receipt of the end event, the Soft Switch confirms the end event and issues a fax end command to the sending and receiving gateways at the same time. After receiving the fax end command issued by the Soft Switch, the two gateways switch back to voice state respectively. In the solution shown in FIG. 1, the period for the gateways and the Soft Switch to exchange the fax end event and the switching command equals to the sum of the transmission delay of the fax end event from the sending gateway to the Soft Switch, the processing period of the Soft Switch and the transmission delay of the switching command from the Soft Switch to the sending/receiving gateways. The period for the DCN signal to integrally reach the receiving facsimile machine from the sending gateway equals to the sum of the IP transmission delay of the IFP packet of the DCN signal for reaching the receiving gateway, the processing period of unpacking, buffering and so on performed by the receiving gateway, and the transmission delay of the DCN signal on the PSTN line from the receiving gateway to the receiving facsimile machine. For example, in a NGN network with a good network condition, the period from the time when a gateway reports a Fax event to the time when a receiving gateway receives a switching command issued by a Soft Switch is only tens of milliseconds, usually no more than 100 ms. However, for an integral DCN signal from the sending gateway to the receiving facsimile machine, the transmission period on the PSTN line is at least 160 ms (DCN signal length: Frame Header 79 ms (3 bytes), HDLC Frame FCS Bytes: 53 ms (2 bytes), Trailing Sync Bytes: 26 ms (1 flags)). If the transmission delay of the DCN on the IP network and the processing period of the receiving gateway are taken into account, the period for the integral DCN signal from the sending gateway to the receiving facsimile machine at least reaches nearly 200 ms. Thus, this technical solution may result in the case that the receiving gateway may receive a fax end command issued by the Soft Switch during sending a DCN signal to the receiving facsimile machine or before sending the DCN signal, and switch its state from Fax state to voice state. As a result, the receiving facsimile machine cannot receive a valid DCN signal, which causes the receiving facsimile machine to think that the Fax terminates abnormally and to send out an alarm sound. This misleads the Fax user into thinking that the Fax fails.

Another technical solution employed by a gateway of the prior art is illustrated in FIG. 4. During a T.38 Fax service, Gateway 2 detects data on the IP side (i.e., the side between Gateway 1 and Gateway 2). If a DCN frame signal is received by Gateway 2, Gateway 2 modulates the DCN signal and sends the modulated one to the receiving facsimile machine. After sending the modulated DCN signal, Gateway 2 reports a fax end event to a Soft Switch, so as to ensure the DCN signal to successfully reach the receiving facsimile machine. This technical solution switches Fax state to voice state depending on the IP-side signal, and does not support the TDM-side DCN signal detection and report. This technical solution has the following disadvantages: 1) since the two gateways employ different DCN detecting and reporting mechanisms, if the sending gateway employs this solution, no DCN signal will be received on the IP side, and at this point, if the receiving gateway only detects on the TDM side, no fax end event will be reported to the Soft Switch when a Fax is ended; 2) if the sending gateway employs the former technical solution, the disadvantages of the former technical solution may also appear; and thus result in the situation that the receiving facsimile machine cannot receive a valid DCN signal.

SUMMARY OF THE INVENTION

The present invention aims to provide a method for ensuring reliable transmission of a DCN signal to a facsimile machine, so as to overcome the problem that in T.38 Fax service, reporting a fax end event by a gateway depending on detecting a DCN frame signal on the TDM side may result in that a receiving facsimile machine cannot receive an integral and valid DCN signal.

The present invention tends to overcome another technical problem that in T.38 Fax service, reporting a fax end event by a gateway depending on detecting a DCN signal on the IP side may be unreliable and the DCN signal may not be transferred to the receiving facsimile machine reliably and effectively.

The present invention further aims to provide a method for ensuring reliable transmission of a DCN signal to a facsimile machine, which is compatible with the existing gateways. The method may overcome the issue that in T.38 Fax service, reporting a fax end event by a gateway depending on detecting a DCN frame signal on the TDM side may result in that a receiving facsimile machine cannot receive an integral and valid DCN signal. The method may also overcome the issue that in T.38 Fax service, reporting a fax end event by a gateway depending on detecting a DCN signal on the IP side may be unreliable and the DCN signal may not be transferred to the receiving facsimile machine reliably and effectively.

To overcome the above technical problems, the present invention employs the following technical solutions.

A method for ensuring reliable transmission of a DCN signal to a facsimile machine by a T.38 gateway, including:

detecting, by the gateway, frame signals demodulated and received on a TDM side, and packing, by the gateway, a DCN signal for a facsimile into an IFP packet and sending the IFP packet to an IP side when the DCN signal is detected;

reporting, by the gateway, a fax end event to a Soft Switch after a designated delay period, after packing the DCN signal and sending the packed DCN signal to the IP side, wherein the designated period is a period required to ensure that the DCN signal integrally reaches a receiving facsimile machine; and issuing, by the Soft Switch, a State Switching Command to control the sending gateway and the receiving gateway to switch from Fax state back to voice state, after receiving the fax end event by the Soft Switch.

The method further includes:

detecting, by the gateway, frame signals on the IP side, and modulating a DCN signal and sending the modulated DCN signal to the receiving facsimile machine when the DCN signal is detected;

when the gateway receives a State Switching Command issued by the Soft Switch during sending the DCN signal to the receiving facsimile machine, continuing, by the gateway, sending the DCN data to the receiving facsimile machine, and responding, by the gateway, to the State Switching Command and switching back to voice state after the DCN data is sent; and when the gateway has not received the State Switching Command from the Soft Switch after the DCN data is sent, reporting, initiatively by the gateway, a fax end event to the Soft Switch.

In the method, the reporting by the gateway a fax end event to a Soft Switch after a designated delay period includes: starting, by the gateway, a timer for timing after packing the DCN signal and sending the packed DCN signal to the IP side, and reporting, by the gateway, the fax end event to the Soft Switch when the timer finishes a designated period.

In the method, the designated period is set as 600 ms.

Another method for ensuring reliable transmission of a DCN signal to a facsimile machine by a T.38 gateway, including:

detecting, by the gateway, frame signals on an Internet Protocol (IP) side, and modulating a DCN signal and sending the modulated DCN signal to a receiving facsimile machine when the DCN signal is detected;

when the gateway receives a State Switching Command issued by a Soft Switch during sending the DCN signal to the receiving facsimile machine, continuing, by the gateway, sending the DCN data to the receiving facsimile machine, and responding, by the gateway, to the State Switching Command and switching back to voice state after the DCN data is sent; and when the gateway has not received the State Switching Command from the Soft Switch after the DCN data is sent, reporting, initiatively by the gateway, a fax end event to the Soft Switch.

In the above two methods, the continuing sending the DCN data to the receiving facsimile machine and responding to the State Switching Command and switching back to voice state after the DCN data is sent and the reporting initiatively by the gateway a fax end event to the Soft Switch include: an identification variable is configured in the gateway, for identifying whether the gateway has received the State Switching Command from the Soft Switch; the gateway queries the identification variable after the DCN data is sent: if the identification variable indicates that the State Switching Command from the Soft Switch is received, the gateway processes the State Switching Command from the Soft Switch and switches back to voice state; otherwise, the gateway reports the fax end event to the Soft Switch.

In the method, when the gateway receives the State Switching Command from the Soft Switch, the identification variable is set as 1; otherwise, the identification variable is set as 0.

The present invention has the beneficial effects as follows. In the T.38 Fax service, by using the above technical solutions, a gateway, no matter whether it acts as a sending gateway or a receiving gateway, may reliably detect a fax end event and reliably transmit a DCN signal to a terminal facsimile machine. Moreover, the solutions are also compatible with the existing gateways, and in application, no matter whether the gateway using the above technical solutions communicates with a gateway employing the former solution of the prior art or a gateway employing the later solution of the prior art, in other words, no matter whether the gateway using the above technical solutions acts as a sending party or a receiving party, it may reliably detect a fax end event, and it may be ensured that the DCN signal integrally reaches the facsimile machine. Therefore, the solutions of the present invention have good compatibility, practical applicability and reliability.

DETAILED DESCRIPTION OF THE EMBODIMENTS

The present invention will be further illustrated hereunder in detail with reference to the drawings and embodiments.

Figure 1:
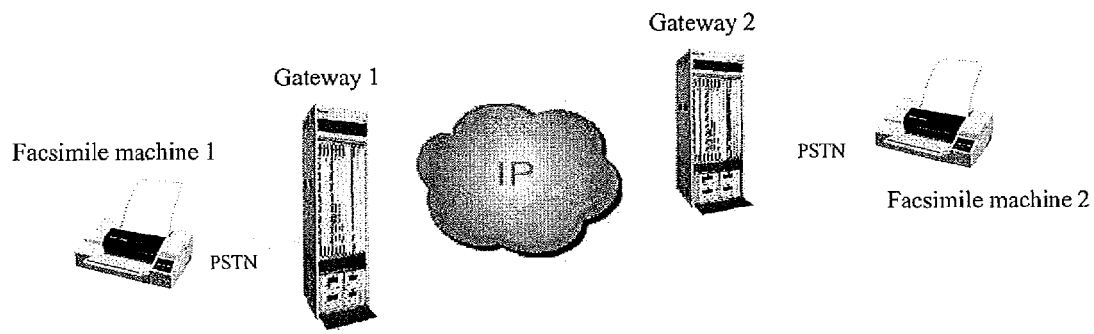
FIG. 1 is a structure diagram illustrating a T.38 Real-time Fax system in the prior art.
Figure 2:
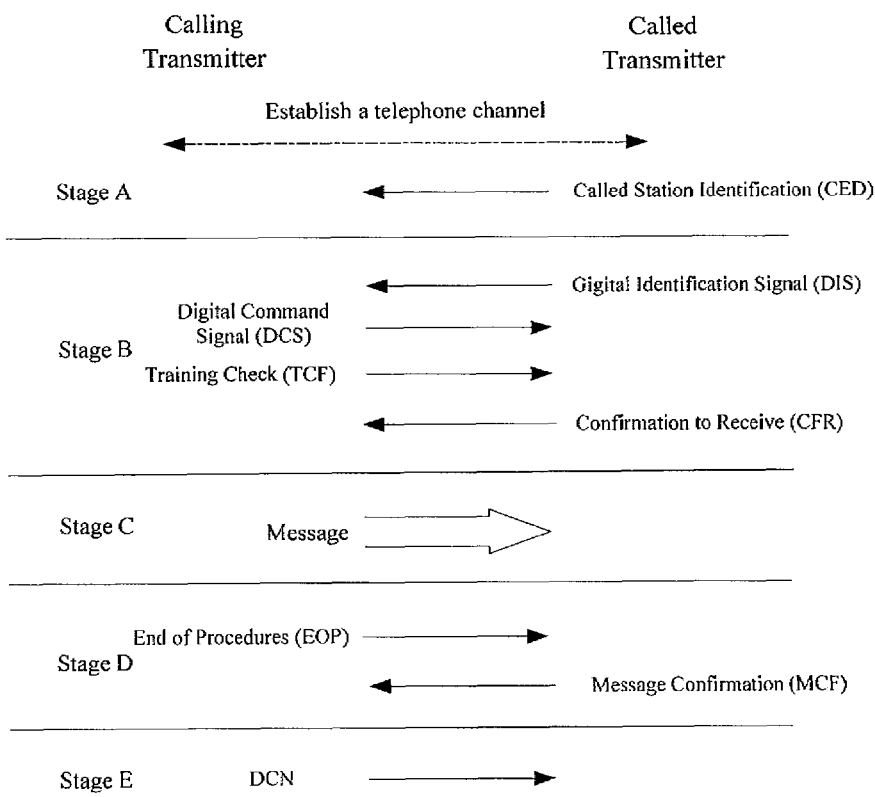
FIG. 2 is a flow chart of a typical Real-time IP Fax in the prior art.
Figure 3:
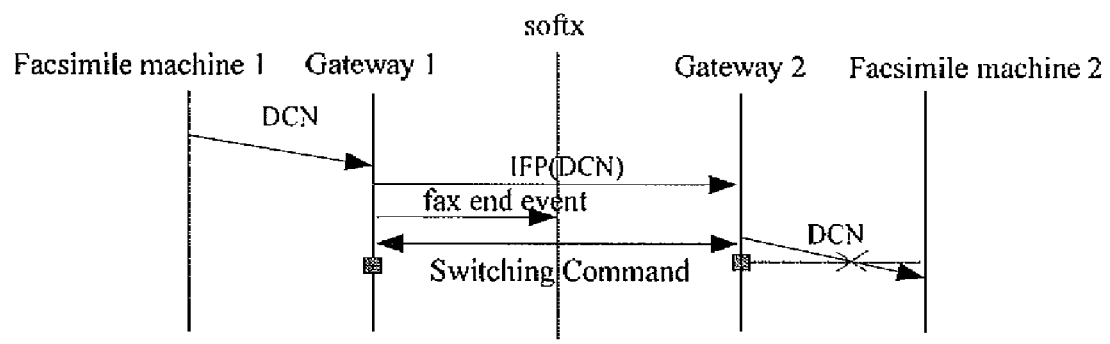
FIG. 3 is a schematic diagram illustrating a technical solution of the prior art.
Figure 4:
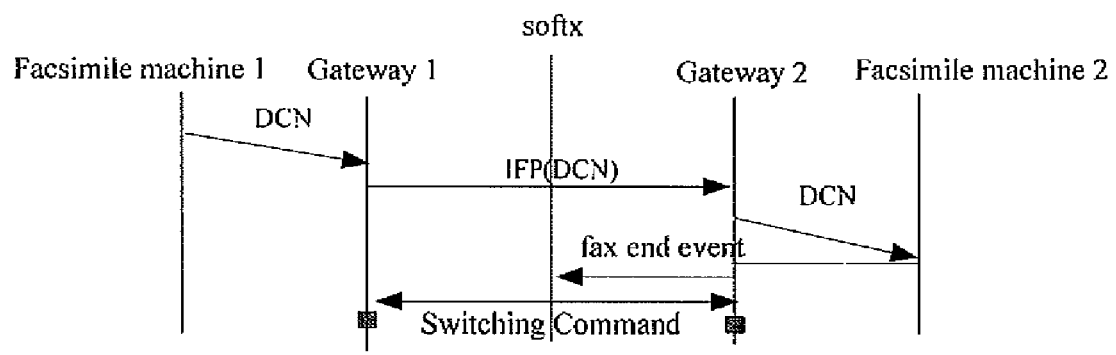
FIG. 4 is a schematic diagram illustrating another technical solution of the prior art.
Figure 5:
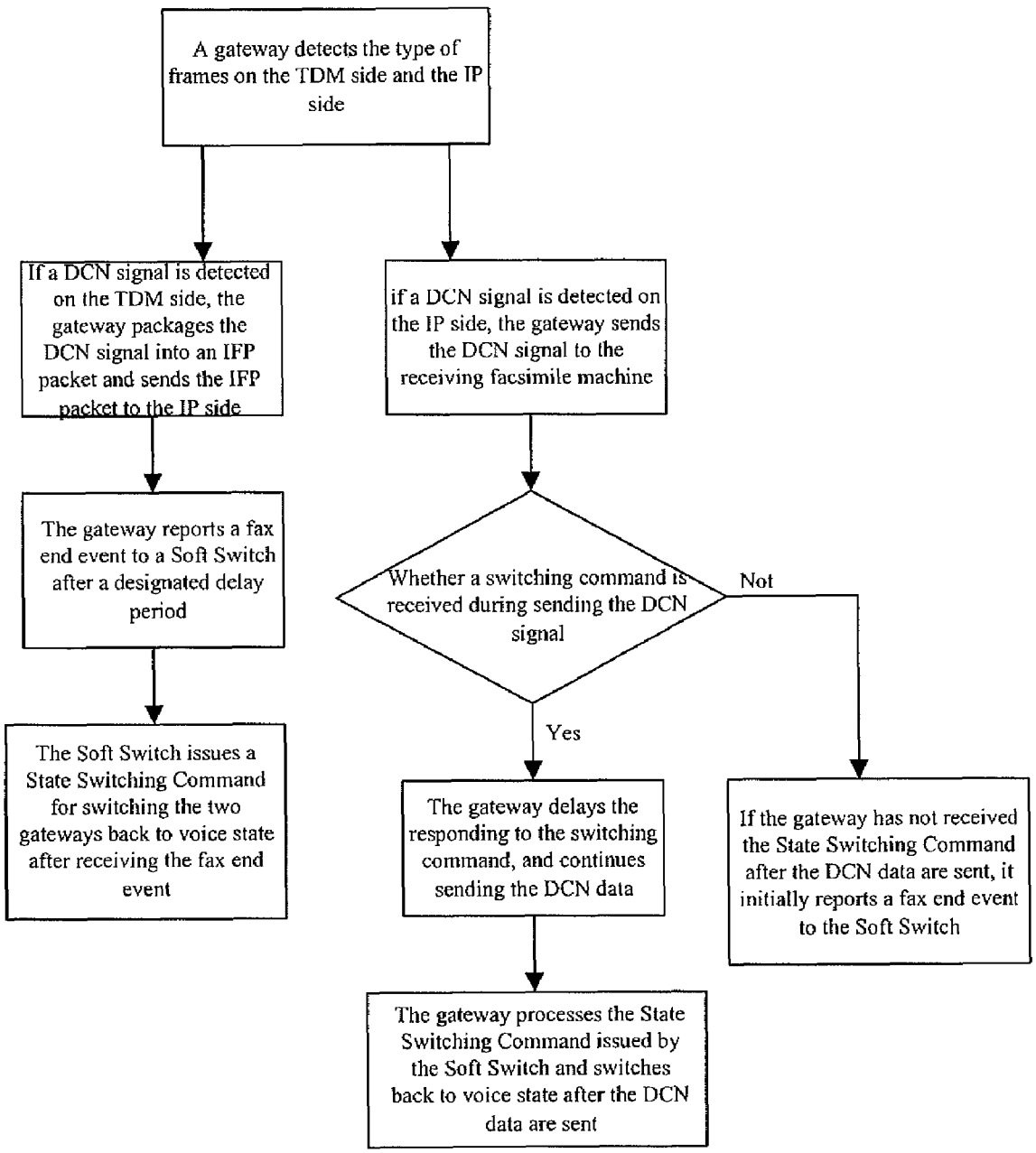
FIG. 5 is a flow chart illustrating a method according to the present invention.
Figure 6:
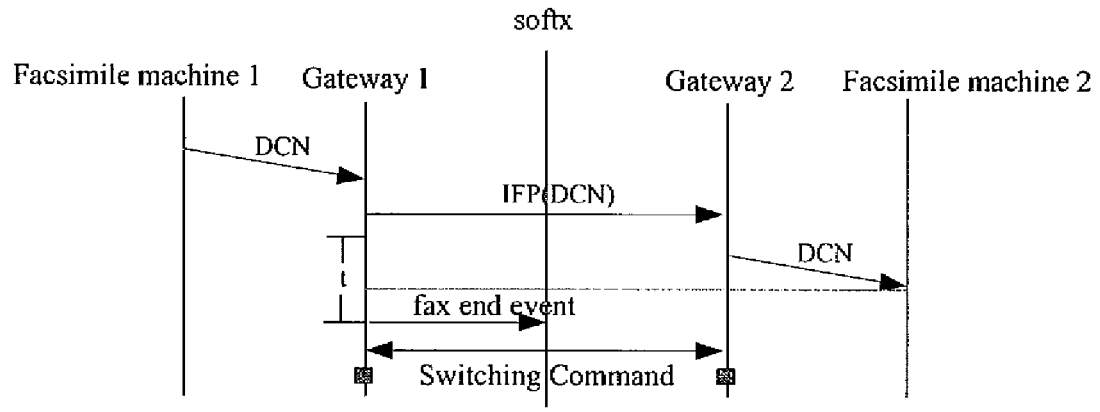
FIG. 6 is a schematic diagram illustrating a condition that a gateway of the present invention acts as a sending gateway according to the present invention.

To ensure reliable transmission of a DCN signal to a facsimile machine, the present invention provides different processing methods when a gateway acts as a sending gateway and when a gateway acts as a receiving gateway, respectively. As shown in FIG. 5, a method includes: first of all, a gateway judges V.21 frame signals demodulated and received on the TDM side and V.21 frame signals received on the IP side. If a DCN signal is received on the TDM side, the gateway, as a sending gateway, employs a solution for sending gateway. If the gateway detects a DCN signal on the IP side, the gateway, as a receiving gateway, employs a solution for receiving gateway. When the gateway acts as a sending gateway, the method includes the steps as follows (further referring to FIG. 6):

A) the gateway detects the frame signal demodulated and received on the TDM side; if a DCN signal is detected, the gateway, as a sending gateway, packs the DCN signal into an IFP packet and sends the IFP packet to the IP side;

B) to ensure that the receiving gateway has sufficient time to receive the IFP packet of the DCN from the IP side and integrally modulate the IFP packet and send the modulated IFP packet to the receiving facsimile machine, the sending gateway delays a designated period after packing and sending the DCN signal to the IP side, and then reports a fax end event to a Soft Switch; and C) after receiving the fax end event, the Soft Switch issues a State Switching Command to control the sending and receiving gateways to switch from Fax state back to voice state.

The designated delay period in Step B refers to a period required to ensure that the DCN signal reaches a receiving facsimile machine integrally. Since the transmission period of an integral DCN signal on a PSTN line is at least 160 ms, considering a possible delay period of 200 ms to 300 ms on the IP network and a processing period for the receiving gateway, the designated period for delaying the reporting may be selected as 600 ms in practical operation, so as to ensure the receiving facsimile machine to receive the DCN signal before the designated period elapses. In a specific embodiment, Step B employs: after packing the DCN signal and sending the packed DCN signal to the IP side, the gateway starts a timer, which may be implemented via software, for timing; the sending gateway reports the fax end event to the Soft Switch when the timer finishes the designated period (such as 600 ms), so as to ensure the receiving facsimile machine to receive the DCN signal before the delay period elapses.

Figure 7:
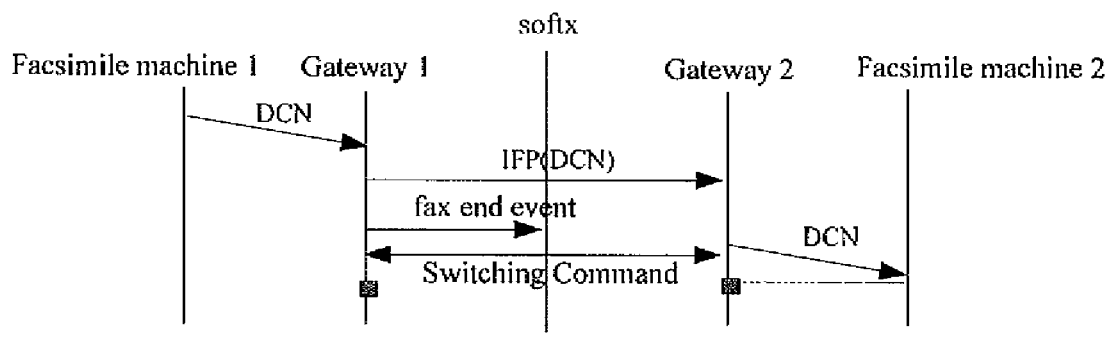
FIG. 7 is a schematic diagram illustrating a condition that a gateway of the present invention acts as a receiving gateway according to the present invention.

Referring to FIG. 7, if the gateway detects a DCN signal on the IP side, the gateway, as a receiving gateway, is capable of detecting the DCN signal on the IP side and reporting a fax end event to the Soft Switch, and capable of delaying a switching when receiving a switching command issued by the Soft Switch during the process of sending DCN data to the receiving facsimile machine. Therefore, when the gateway acts as a receiving gateway, the method includes the steps as follows:

D) the gateway detects the frame signal on the IP side; if a DCN signal is detected by the gateway, the gateway, as a receiving gateway, modulates the DCN signal and sends the modulated DCN signal to the receiving facsimile machine;

E) if the receiving gateway receives a State Switching Command issued by the Soft Switch during the process of sending the DCN signal to the receiving facsimile machine, the receiving gateway does not respond to the switching command at once. In other words, the receiving gateway does not switch from Fax state to voice state at once. Instead, it continues sending the DCN data to the receiving facsimile machine; and the receiving gateway responds to the State Switching Command and switches back to voice state after the DCN data is sent completely;

F) if the gateway does not receive the State Switching Command from the Soft Switch after the DCN data is sent completely, the gateway initiatively reports a fax end event to the Soft Switch.

The above Step E and Step F include the process as follows. An identification variable is configured in the gateway, for identifying whether the gateway has received the State Switching Command from the Soft Switch. When the switching command is received, the identification variable is set as 1; otherwise, it is set as 0. When the receiving gateway receives the State Switching Command issued by the Soft Switch during the process of sending the DCN signal to the receiving facsimile machine, the identification variable is set as 1, and the receiving gateway does not switch from Fax state to voice state at once, but continues sending the DCN data to the TDM side. When the receiving gateway sends a flag indicating the end of the DCN frame, the receiving gateway considers that the DCN data has been sent, and checks the identification variable. If the identification variable is 1, the receiving gateway processes the State Switching Command from the Soft Switch and switches back to voice state. If the identification variable is still 0, which indicates that the receiving gateway has not received the State Switching Command from the Soft Switch, the receiving gateway initiatively reports a fax end event to the Soft Switch. Thus, reliable Fax-to-Voice switching may be ensured when the sending gateway is not able to detect and report a DCN signal on the TDM side (for example, when the sending gateway employs the later technical solution of the prior art).

It may be seen from the above that the present invention provides methods for reliably detecting a fax end event and reliably transmitting a DCN signal to a terminal facsimile machine when the gateway acts as a sending gateway and when the gateway acts as a receiving gateway, respectively. The present invention further provides a solution for ensuring reliable transmission of a DCN signal to a terminal facsimile machine by employing the above two methods at the same time in a gateway. A gateway employing this solution detects the type of frames on the TDM side and on the IP side; if a DCN signal is detected on the TDM side, it will be processed according to the method for a sending gateway; if a DCN signal is detected on the IP side, it will be processed according to the method for a receiving gateway. Therefore, the solution may overcome not only the problem that in T.38 Fax service, reporting a fax end event by a gateway depending on detecting a DCN frame signal on the TDM side may result in that a receiving facsimile machine cannot receive an integral and valid DCN signal, but also the problem that in T.38 Fax service, reporting a fax end event by a gateway depending on detecting a DCN signal on the IP side may be unreliable and the DCN signal may not be transferred to the receiving facsimile machine reliably and effectively. The above methods have been applied to practical gateway products. When a gateway employing the technical solution of the present invention intercommunicates with a gateway employing the former technical solution of the prior art or the later technical solution of the prior art, no matter whether the gateway employing the technical solution of the present invention acts as a sending party or a receiving party, it may be ensured that the DCN signal integrally reaches the facsimile machine. Therefore, the solution of the present invention has good compatibility, practical applicability and reliability.

It will be understood by those skilled in the art that various alternatives and variations may be made on the inventive technical solution and concept, without departing from the protect scope of the present invention as defined by the appended claims.

The invention claimed is:

1. A method for ensuring reliable transmission of a DCN signal by a gateway, comprising:
   detecting a frame signal to determine whether the frame signal is a DCN signal;
   packing and sending the DCN signal when the frame signal is a DCN signal; and
   reporting a fax end event after a designated period, the designated period starting from when the DCN signal is sent,
   wherein the designated period ensures that the DCN signal integrally reaches a receiving facsimile machine.

2. The method according to claim 1, wherein the reporting a fax end event after a designated period comprises:
   starting a timer for timing from when the DCN signal is sent, and reporting the fax end event when the timer finishes the designated period.

3. The method according to claim 2, wherein the designated period is set as 600 ms.

4. A method for ensuring reliable transmission of a DCN signal by a gateway, comprising:
   detecting a frame signal to determine whether the frame signal is a DCN signal;
   modulating and sending the DCN signal when the frame signal is a DCN signal; and
   receiving a State Switching Command during sending the DCN signal, and switching, in response to the State Switching Command, the current state to voice state after the DCN signal is completely sent.

5. The method according to claim 4, further comprising:
   reporting a fax end event, after the DCN signal is sent without receiving the State Switching Command.

6. The method according to claim 5, wherein an identification variable is configured in the gateway, for identifying whether the gateway has received the State Switching Command; the gateway queries the identification variable after the DCN signal is sent;
   wherein if the identification variable indicates that the State Switching Command is received, the gateway processes the State Switching Command and switches to voice state; otherwise, the gateway reports the fax end event.

7. The method according to claim 6, wherein when the gateway receives the State Switching Command, the identification variable is set as 1; otherwise, the identification variable is set as 0.

8. A gateway for ensuring reliable transmission of a DCN signal, wherein the apparatus comprises:
   a component configured to detect a frame signal to determine whether the frame signal is a DCN signal;
   a component configured to packet and send the DCN signal when the frame signal is a DCN signal; and
   a component configured to report a fax end event after a designated period, the designated period starting from when the DCN signal is sent,
   wherein the designated period ensures that the DCN signal integrally reaches a receiving facsimile machine.

9. A gateway for ensuring reliable transmission of a DCN signal, wherein the apparatus comprises:
   a component configured to detect a frame signal to determine whether the frame signal is a DCN signal;
   a component configured to modulate and send the DCN signal when the frame signal is a DCN signal; and
   a component configured to continue the sending of the DCN signal until the DCN signal is sent, upon receiving a State Switching Command during sending the DCN signal, and switch the current state to voice state.

10. The gateway according to claim 9, further comprising:
    a component configured to report a fax end event after the DCN signal is sent without receiving the State Switching Command.

* * * * *